US008358600B2

(12) United States Patent
Bevin et al.

(10) Patent No.: US 8,358,600 B2
(45) Date of Patent: Jan. 22, 2013

(54) METHOD OF TRANSMITTING DATA IN A COMMUNICATION SYSTEM

(75) Inventors: Michael Bevin, Tallinn (EE); Karsten Vandborg Sorensen, Stockholm (SE); Antonio Varanda, London (GB); Tiago Loureiro, Tallinn (EE)

(73) Assignee: Skype, Dublin (IE)

( * ) Notice: Subject to any disclaimer, the term of this patent is extended or adjusted under 35 U.S.C. 154(b) by 1280 days.

(21) Appl. No.: 12/004,494

(22) Filed: Dec. 20, 2007

(65) Prior Publication Data

US 2008/0304429 A1    Dec. 11, 2008

(30) Foreign Application Priority Data

Jun. 6, 2007   (GB) .................................. 0710878.0

(51) Int. Cl.
*H04L 12/16*    (2006.01)
*H04Q 11/00*   (2006.01)
(52) U.S. Cl. ...................................... 370/267; 370/352
(58) Field of Classification Search .................. 370/352, 370/267, 268
See application file for complete search history.

(56) References Cited

U.S. PATENT DOCUMENTS

| 7,945,006 B2* | 5/2011 | Chen et al. ..................... 375/349 |
| 2002/0085697 A1* | 7/2002 | Simard et al. ............ 379/202.01 |
| 2003/0174657 A1 | 9/2003 | Qin et al. |
| 2006/0285490 A1* | 12/2006 | Kadaba et al. ................ 370/230 |

FOREIGN PATENT DOCUMENTS

EP    1 113 657 A2    7/2001

OTHER PUBLICATIONS

International Search Report and Written Opinion of the International Searching Authority, PCT/EP2008/053688, 9 pp., Date of Mailing: Jul. 31, 2008.
International Preliminary Report on Patentability, PCT/EP2008/053688, 5 pp., Date of Mailing: Dec. 17, 2009.

* cited by examiner

*Primary Examiner* — Asad Nawaz
*Assistant Examiner* — Justin N Mullen
(74) *Attorney, Agent, or Firm* — Wolfe-SBMC (57) ABSTRACT

A method of transmitting a combined audio signal to at least one of a plurality of participants in a communication event comprising; receiving an audio signal from each of said plurality of participants together with audio activity information associated with each of said received audio signals; analysing a measure of audio activity for each received audio signal based on the audio activity information associated with each of said received signals, wherein said measure of audio activity allows audio signals comprising audio activity to be compared; selecting a set of audio signals from said received audio signals based on the analysed measure of audio activity for each signal; decoding said set of audio signals; and combining said set of audio signals to generate said combined audio signal to be transmitted to said at least one of said plurality of participants.

17 Claims, 3 Drawing Sheets

METHOD OF TRANSMITTING DATA IN A COMMUNICATION SYSTEM

RELATED APPLICATION

This application claims priority under 35 U.S.C. §119 or 365 to Great Britain, Application No. 0710878.0, filed Jun. 6, 2007. The entire teachings of the above application are incorporated herein by reference.

TECHNICAL FIELD

The present invention relates to communication systems. More particularly the present invention relates to a method and apparatus for transmitting and decoding data in a communication system.

BACKGROUND

In a communication system a communication network is provided, which can link together two communication terminals so that the terminals can send information to each other in a call or other communication event. Information may include speech, text, images or video.

Modern communication systems are based on the transmission of digital signals. Analogue information such as speech is input into an analogue to digital converter at the transmitter of one terminal and converted into a digital signal. The digital signal is then encoded and placed in data packets for transmission over a channel to the receiver of another terminal.

One type of communication network suitable for transmitting data packets is the internet. Protocols which are used to carry voice signals over an Internet Protocol (IP) network are commonly referred to as Voice over IP (VoIP). VoIP is one of the protocols used for routing of voice conversations over the Internet or through any other IP-based network.

It is known to connect more than two terminals via a communication system in a conference call. In a conference call, a group of participating terminals may be connected together via a host. The host is arranged to collect incoming signals from each participating terminal and combine the signals before sending the combined signals to the participating terminals.

Figure 1:
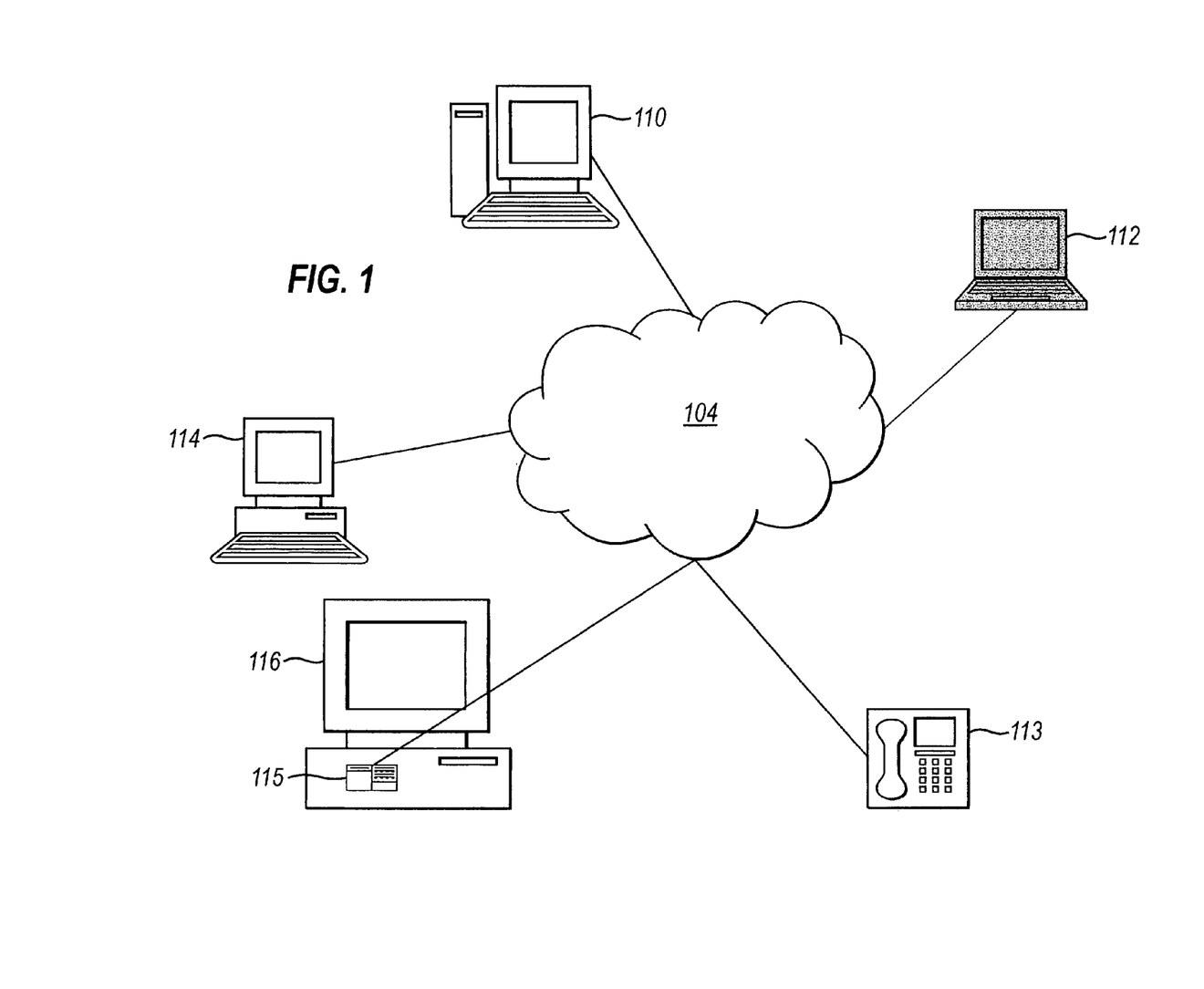
FIG. 1 is a diagram showing a communication network.

Reference is made to FIG. 1 which shows a group of participating terminals 110, 112, 113, 114 and 116 connected via the internet 104. In this arrangement a host 115 resides in a participating terminal 116. Alternatively the host may be provided by a host sever.

In order to combine the signals it is necessary for the host to decode the signals and mix the decoded signals before transmitting the combined signals to each of the participating terminals.

When hosting a conference call the number of signals that are decoded is proportional to the number of participating terminals. For conference calls with a large number of participating terminals decoding each signal provided from the participating terminals places a large burden on the resources of the host.

A participating terminal may be a personal computer or a mobile phone with limited processing resources. Therefore the burden placed on the resources of the host can be a particular problem if the host resides in one of the participating terminals. For example if the CPU (Central Processing Unit) usage of the host is too high this will result in poor sound quality during the conference call.

In order to reduce the burden on the resources of the host it is known to select only some of the incoming signals to be decoded. In most cases only some of the signals provided from the participating terminals will need to be mixed as in general the only some of the signals will contain speech.

One known method of reducing the number of signals that the host is required to decode is achieved by transmitting a bit in each data packet to indicate whether the signal contains speech. In this case the host is arranged to examine the bit in the packet before fully decoding the packet. Only packets that are indicated to include speech are then decoded by the host.

However this method is of limited benefit as the host is still required to decode each packet that contains speech. The host may determine that the decoded packet of a signal is not required in the mixed signal if for example the speech contained in the packet is too quiet. As such the number of signals that have been decoded will exceed the number of signals included in the mixed signal.

An alternative method of reducing the number of signals that are decoded by the host requires each signal to be encoded with the same encoding scheme. In this case the host may use knowledge of the encoding scheme to analyse the encoded bit stream to estimate the speech strength in each signal. The host may then determine which signals should be decoded from the relative speech strengths of the signals.

However this method is limited as it requires each participating terminal to use the same encoding scheme. Furthermore it is necessary for the host to apply a detailed analysis to the encoded bit stream which also uses significant resources.

It is therefore an aim of the present invention to overcome the above identified limitations of the prior art. It is a further aim of the present invention to provide a method of efficiently processing signals in a conference call without the use of complex computational methods.

SUMMARY

According to a first aspect of the invention there is provided a method of transmitting a combined audio signal to at least one of a plurality of participants in a communication event comprising; receiving an audio signal from each of said plurality of participants together with audio activity information associated with each of said received audio signals; analysing a measure of audio activity for each received audio signal based on the audio activity information associated with each of said received signals, wherein said measure of audio activity allows audio signals comprising audio activity to be compared; selecting a set of audio signals from said received audio signals based on the analysed measure of audio activity for each signal; decoding said set of audio signals; and combining said set of audio signals to generate said combined audio signal to be transmitted to said at least one of said plurality of participants.

According to a second aspect of the invention there is provided a host device arranged to transmit a combined audio signal to at least one of a plurality of participants in a communication event comprising; a receiver arranged to receive an audio signal from each of said plurality of participants together with audio activity information associated with each of said received audio signals; a comparator arranged to compare a measure of audio activity for each received audio signal to a measure of audio activity within an active audio range based on the audio activity information associated with each of said received signals, and to select a set of audio signals from said received audio signals based on the measure of audio activity for each signal; a decoder arranged to decode said set of audio signals; and a combiner arranged to combine said set of audio signals to generate said combined audio signal to be transmitted to said at least one of said plurality of participants.

According to a third aspect of the present invention there is provided a participant device participant in a communication event with a plurality of other participant devices, said participant device comprising; input means for receiving an audio signal from a user of said participant device; an audio activity information determiner arranged to determine a measure of audio activity in the received audio signal and to generate audio activity information associated with the received audio signal, wherein said measure of audio activity allows audio signals comprising audio activity to be compared; and a transmitter arranged to transmit the audio signal and the associated information to a host device arranged to transmit the audio signal to said plurality of other participant devices based on the audio activity information associated with the audio signal.

According to a fourth aspect of the present invention there is provided a communication system comprising a host device and a plurality of participant devices participant in a communication event, wherein each of said participant devices comprises; input means for receiving an audio signal from a user of said participant device; an audio activity information determiner arranged to determine a measure of audio activity in the received audio signal and to generate audio activity information associated with the received audio signal, wherein said measure of audio activity allows audio signals comprising audio activity to be compared; and a transmitter arranged to transmit the audio signal and the audio activity information to the host device; and wherein the host device comprises a receiver arranged to receive the audio signal transmitted from each of said plurality of participants together with said audio activity information associated with each of said received audio signals; a comparator arranged to compare the measure of audio activity for each received audio signal based on the audio activity information associated with each of said received signals, and to select a set of audio signals from said received audio signals based on the measure of audio activity for each signal; a decoder arranged to decode said set of audio signals; and a combiner arranged to combine said set of audio signals to generate said combined audio signal to be transmitted to said at least one of said plurality of participants.

By providing information with the audio signal that allows the host to determine the level of speech activity in the audio signal the host is able to determine more accurately which signals need to be decoded.

By providing information relating to the audio activity of a data packet in a plurality of bits the host has greater flexibility in the manner that a signal is selected.

By providing information relating to the level of audio activity separately from the audio signal, it is not necessary for the host to analyse the encoded audio signal to determine whether or not to decode the signal. As such, embodiments of the present invention are independent of the encoding scheme used to encode the audio signal.

BRIEF DESCRIPTION OF THE DRAWINGS

For a better understanding of the present invention and to show how the same may be carried into effect, embodiments of the present invention will now be described with reference to the following drawings.

DETAILED DESCRIPTION

Reference will first be made to FIG. 1, which shows user terminals 110, 112, 113, 114 and 116 connected to a communication network 104. In one embodiment of the invention the communications network is a VoIP network provided by the internet. It should be appreciated that even though the exemplifying communications system shown and described in more detail herein uses the terminology of a VoIP network, embodiments of the present invention can be used in any other suitable communication system that facilitates the transfer of data. For example, in an alternative embodiment of the invention the communication network may be a PSTN (Public Switched Telephone Network) or a GSM (Global System for Mobile Communications) network.

The terminals 110, 112, 113, 114 and 116 may be, for example, a personal computer, a gaming device, a personal digital assistant, a suitably enabled mobile phone, a television or other device able to connect to the network 104. A terminal may be directly connected to the communication network 104, or via another communication network (not shown).

Users of the terminals 100, 112, 113, 114 and 116 may participate in a conference call whereby the terminals are arranged to transmit data to each other via a conferencing host 115. According to a preferred embodiment of the invention the conferencing host 115 resides in a participating terminal 116 as shown. Alternatively the host 115 may be provided by a host server.

It should be appreciated that the host may be implemented as software running on a processor in a participating terminal or a host server. Alternatively the host may be implemented as hardware in either the terminal or a host server.

The user of each terminal participating in a conference call inputs an audio signal to the terminal. The terminal transmits the audio signal input from the user to the host 115. The host 115 is arranged to decode and combine selected signals received from the terminals participating in the conference call. A combined signal is then transmitted from the host to each of the participating terminals.

In accordance with an embodiment of the invention the participating terminals are arranged to transmit information relating to the speech activity level of the signal received from user of the terminal to the host 115. The host 115 may then select which signals received from the participating terminals to decode based on the speech activity level information provided with each signal.

Figure 2:
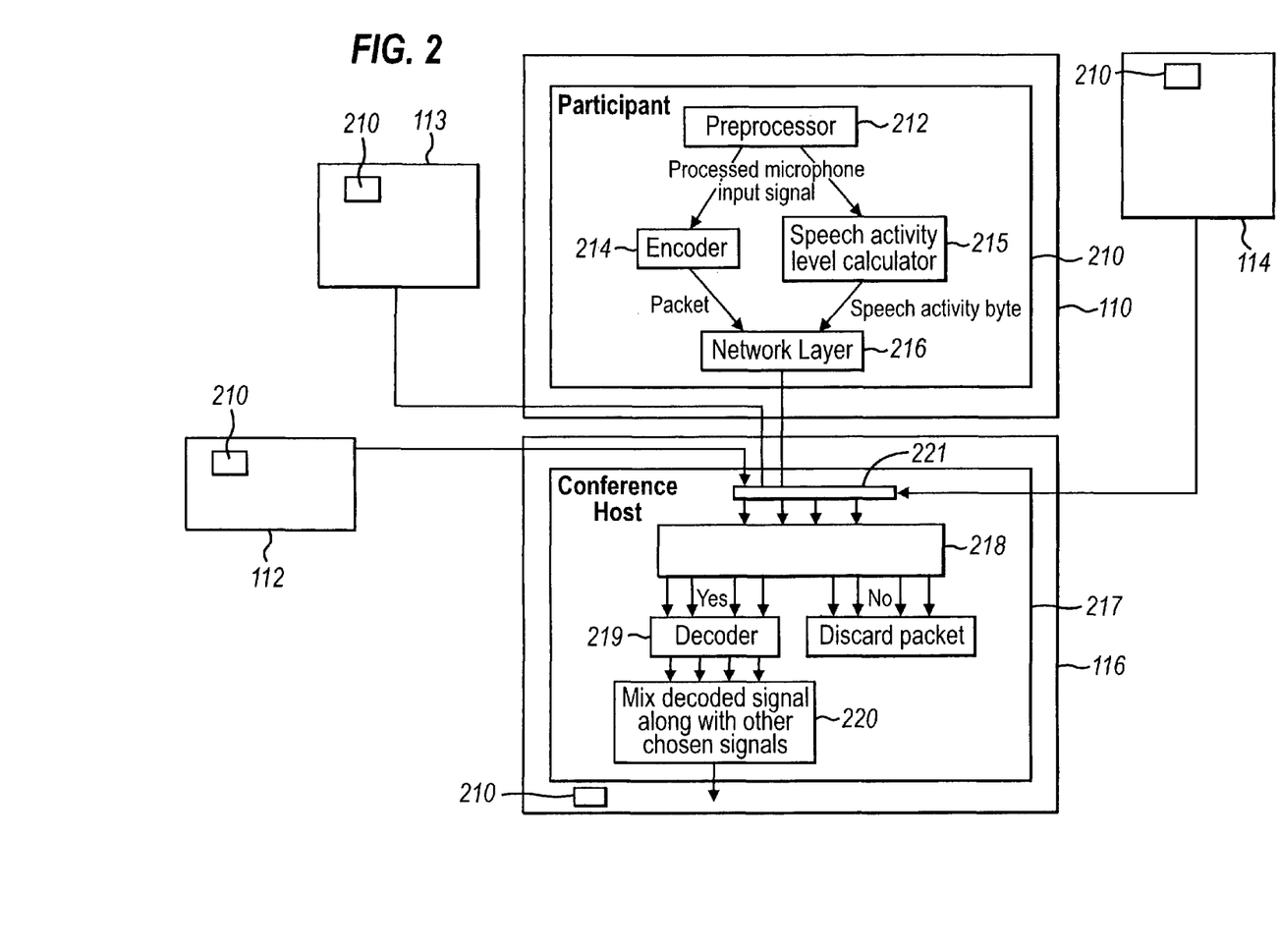
FIG. 2 is a diagram showing receiving and transmitting circuitry according to an embodiment of the present invention.

FIG. 2 is a diagram showing the transmission of data from the participating terminals 110, 112, 113, 114 and 116 to the host 115. Each participating terminal comprises a transmitting circuitry 210. The host 115 comprises receiving circuitry 217.

The transmitting circuitry 210 of terminal 110 is shown in detail. The transmitting circuitry 210 includes a pre-processor 212, an encoder 214, a speech activity level calculator 215 and a network layer 216. In one embodiment of the invention components of the transmitting circuitry may be implemented as software running on the terminal. In alternative embodiment of the invention the components of the transmitting circuitry may be implemented as hardware in the terminal.

The terminal 110 may receive an audio signal from the user of the terminal 110 via a microphone. Alternatively the signal may be received from a media data storage device such as a CD (compact disc). The signal may be input to the pre-processor via an analogue to digital converter (not shown). The pre-processor 212 is arranged to reduce noise and echo from the input signal. The pre-processor may also adjust the signal level by controlling the gain that is applied to the signal. The pre-processor may also be arranged to control the analogue gain which is applied before the signal is sampled by the analogue to digital converter. The output signal from the pre-processor is then input into the encoder 214 and the speech activity level calculator 215.

The encoder 214 is arranged to encode the digital signal according to an encoding scheme and to output encoded data packets to the network layer 216.

According to an embodiment of the invention the speech activity calculator 215 analyses the speech activity information in the audio signal output from the pre-processor 212. The speech activity calculator 215 is arranged to determined a measure of speech activity in the signal output from the pre-processor. In one embodiment of the invention this may be determined directly from the amplitude of the audio signal. However in a preferred embodiment of the invention the speech activity may be determined from an estimation of the signal plus noise to noise ratio (SNNR) of the signal output from the pre-processor 212 as will be described hereinafter.

The speech activity calculator is arranged to output information on the measure of the speech activity level in the signal to the network layer 216. The information on speech activity in the signal may then be transmitted to the host 115 together with the data packet containing the part of the signal to which the information of speech activity relates. In a preferred embodiment of the invention the measure of speech activity of the part of the signal contained in the data packet is represented by a series of bits. The measure of speech activity represented by the series of bits will indicate the level of active speech in the signal. As such the series of bits will indicate not only the presence of speech but also the level of active speech present in the data packet. This enables that the level of active speech in the data packet may be compared to the level of active speech in other data packets received at the host 115. The series of bits may be contained in a single byte of data, hereinafter referred to as the speech activity level byte. In alternative embodiments of the invention the series of bits may be contained in more or less than one byte of data.

The network layer 216 is arranged to transmit the data packets containing the audio signal together with the measure of speech activity for each data packet to the host 115 via the network 104.

Reference is now made to the receiving circuitry 217 of the participating terminal 116 in which the host 115 resides as shown in FIG. 2.

The receiving circuitry 217 includes a jitter buffer 221, a packet selection block 218, a decoder 219 and a mixer block 220. In one embodiment of the invention components of the receiving circuitry 217 may be implemented as software running on the terminal 116. In alternative embodiment of the invention the components of the receiving circuitry may be implemented as hardware in the terminal 116.

The receiving circuitry 217 receives the data packets from each participating terminal together with the speech activity level byte associated with each data packet. The receiving circuitry temporarily stores the received data packets and the associated speech activity bytes in the jitter buffer 221.

A data packet received from each participating terminal is output together with its associated speech activity byte from the jitter buffer to the packet selection block.

The packet selection block 218 is arranged to analyse the speech activity byte for each data packet received from the jitter buffer. In accordance with an embodiment of the invention the packet selection block 218 is arranged to select which signals to output to the decoder 219 from the information provided in the speech activity level byte. The speech level activity byte may define the level of active speech present in the data packet. The packet selection block 218 may be arranged to compare the level of speech activity in data packet to a measure of active speech in another data packet or from a threshold value within an active speech range.

In one embodiment of the invention the packet selection block 218 is arranged to select a predetermined number N of signals that have the highest speech activity levels. In a preferred embodiment of the invention the predetermined number N may be adjusted in dependence on the CPU usage of the host server 115. For example if the CPU usage of the host server 115 is low then the predetermined number N of signals that are decoded is set to be higher than if the CPU usage of the host server is high.

In a further embodiment of the invention the packet selection block 218 may be arranged to select any signals that have a level of speech activity above a predefined threshold. In one embodiment of the invention this may be carried out in combination with selecting N signals with the highest speech activity, such that if any signals in addition to the N signals have a speech activity level that is higher than the threshold value these signals will also be selected for decoding by the packet selection block 218. Alternatively the number of signals selected by the packet selection block having a speech activity level above the threshold may be restricted to N signals.

In an alternative embodiment of the invention the packet selection block 128 may be arranged to select signals using algorithms that involve hysteresis of the speech level values. Hysteresis in the selection process is obtained by favouring the selection of audio signals having high speech activity levels over time. In this case signals having high speech activity levels will not be easily interrupted unless a competing signal clearly is more active.

In one embodiment of the invention the packet selection block 218 is arranged to analyse the speech activity byte of packets stored in the jitter buffer when deciding which signals to output to the decoder. According to this method the packet selection block 128 may take into account the speech activity levels of subsequent parts of the signal when deciding which signals to decode. As speech activity level estimators often have a small delay due to temporal smoothing, this embodiment will select a signal from a participant immediately before the participant has a high speech activity level.

The data provided in the packets of each selected signal is output to the decoder block 14 in the form of a bit stream. Accordingly the decoder block 219 receives a bit stream for each selected signal from the packet selection block 218. The data packet provided in each unselected signal is discarded.

The decoder block 219 is arranged to decode each bit stream according to the encoding scheme used to encode each signal in the participating terminals.

The decoded bit streams are output from the decoder block 219 to the mixer block 220. The mixer block is arranged to combine the decoded signals received from the decoder block 219 into one signal to be transmitted to each participating terminal 110, 112, 113 and 114. The signal to be transmitted to each participating terminal is encoded according to the encoding scheme used by each terminal before it is transmitted to each terminal via the network 104.

Figure 3:
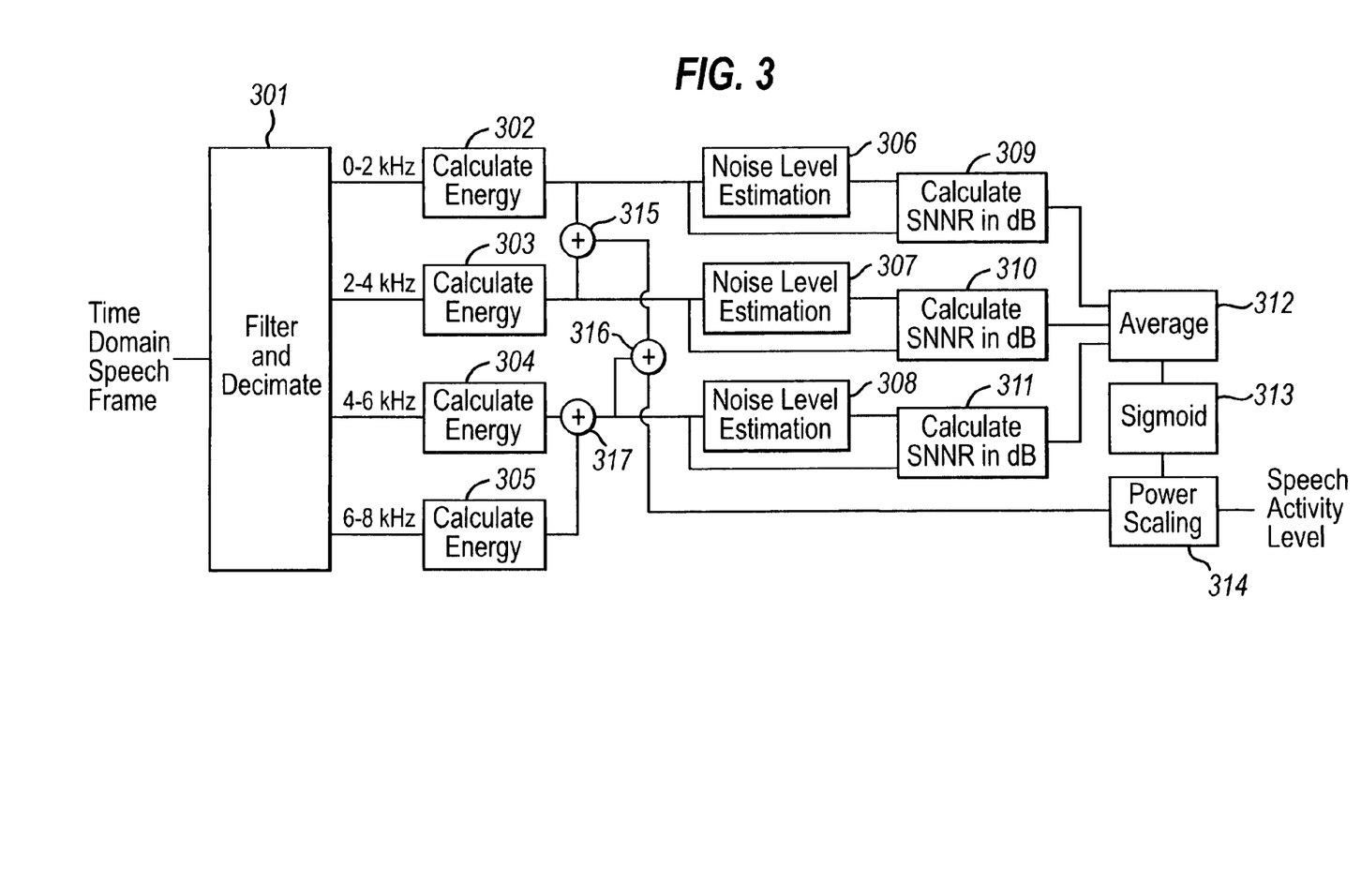
FIG. 3 is a diagram showing a speech activity level calculator according to an embodiment of the present invention.

The method for determining the speech activity level in each participating terminal according to a preferred embodiment of the invention will now be described with reference to FIG. 3. FIG. 3 shows a detailed diagram of the speech activity level block 215 referred to in FIG. 2.

According to a preferred embodiment of the invention, the speech activity level calculator block 215 comprises a filter and decimate block 301, energy calculation blocks 302, 303, 304 and 305, noise level estimation blocks 306, 307 and 308, and SNNR calculation blocks 309, 310 and 311. The speech level activity block further comprises an averaging block 312, a sigmoid block 313 and a power scaling block 314. In one embodiment of the invention components of the speech activity level calculator block may be implemented as software running on the terminal. In an alternative embodiment of the invention the components of the speech activity level calculator block may be implemented as hardware in the terminal.

The filter and decimate block 301 of the speech activity level calculator 215 receives the audio input signal from the pre-processor block 212. The signal input into the filter and decimate block 301 comprises a series of time domain speech frames. In one embodiment the speech frames of the input signal have been sampled at 16 kHz in the pre-processing block 212.

The filter and decimate block 301 comprises a filter bank that is arranged to filter each frame of the input time domain signal into four frequency bands. The frequency content of the input signal ranges from 0 Hz to the Nyquist frequency which is half of the sampling frequency. If the input signal is sampled at 16 kHz the Nyquist frequency is 8 kHz.

The filter bank is arranged to filter the signal into four uniform frequency bands each 2 kHz wide of 0-2 kHz, 2-4 kHz, 4-6 kHz and 6-8 kHz respectively. Each frequency band is then input into a separate energy calculation block 302, 303, 304 and 305 where the energy for each frequency band is calculated.

The energy of the two highest frequency bands 4-6 kHz and 6-8 kHz are added in the summation block 317 to achieve three energy level outputs for non uniform frequency bands 0-2 kHz, 2-4 kHz, and 4-8 kHz.

The energy level outputs for the three non uniform frequency bands are each temporally smoothed by first order auto regressive filters (not shown).
The smoothed signal energy levels for the frequency bands 0-2 kHz, 2-4 kHz and 4-8 kHz are each input into to separate noise level estimator blocks 306, 307 and 308. The noise level estimator blocks 306, 307 and 308 are arranged to estimate the noise level for the frequency bands 0-2 kHz, 2-4 kHz and 4-8 kHz respectively.

The smoothed signal energy levels for the frequency bands 0-2 kHz, 2-4 kHz and 4-8 kHz are also each input into separate SNNR calculation blocks 309, 310 and 311. Each SNNR block is also arranged to receive an output from a noise level estimator block. Each SNNR block 309, 310 and 311 is then arranged to calculate the SNNR energy ratio in decibels (dB) in a frequency band based on the noise energy level in the frequency band output from a noise level estimator block and the smoothed energy level of the frequency band.

Each SNNR block 309, 310 and 311 is arranged to output the SNNR energy ratio for a frequency band to the averaging block 312. The averaging block 312 is arranged to calculate the average SNNR value provided from the SNNR blocks to obtain the SNNR value of the analyzed frame.

The SNNR value of the analysed frame is output from the averaging block 312 to the sigmoid block 313. The sigmoid block is arranged to apply a sigmoid function to limit the range of the SNNR values between 0 and 1.

The sigmoid block 313 is also arranged to provide a 'hangover mechanism' meaning that immediately after the detection of speech activity the hang over mechanism will cause the sigmoid block to indicate speech activity for a period of time. High speech activity levels will cause the sigmoid block to indicate speech activity for a longer hang over period than low speech activity levels. Zero speech activity levels have no hang-over time at all.

The output of the sigmoid block 313 is input into the power scaling block 314. The power scaling block 314 also receives an input value for the total energy of the frame. The energy of the frame is provided to the power scaling block from mixer 316. Mixer 316 is connected to mixer 315 and mixer 317. Mixer 315 receives the energy values from energy calculation blocks 302 and 303, while mixer 317 receives the energy values from energy calculation blocks 304 and 305.

The power scaling block 314 is arranged to scale the output of the sigmoid block by a fixed downscaling factor before upscaling the output by a value dependent on the frame energy. For a low energy signal, the output can be no higher than 0.8 and for a high energy signal, the output can be no higher than 1.

The output of the power scaling block is the measure of the speech activity level to be included in the speech activity byte. In this case the speech activity level is a combined measure of the SNNR as determined by the sigmoid block and the energy of the frame.

While this invention has been particularly shown and described with reference to preferred embodiments, it will be understood to those skilled in the art that various changes in form and detail may be made without departing from the scope of the invention as defined by the claims.

What is claimed is:

1. A method of transmitting a combined audio signal to at least one of a plurality of participants in a communication event, the method comprising:
   receiving an audio signal from each of said plurality of participants together with audio activity information associated with each of said received audio signals, each of said received audio signals comprising one or more data packets, and said audio activity information associated with each of said one or more data packets;
   temporarily storing, in a data storage, each of said received audio signals comprising the one or more data packets together with said audio activity information;
   analyzing a measure of audio activity for each received audio signal based on the audio activity information stored in the data storage and associated with each received audio signal, the measure of audio activity based on a signal-plus-noise to noise ratio of each received audio signal and enabling audio signals comprising audio activity to be compared;
   selecting a set of audio signals from said received audio signals based on the analyzed measure of audio activity for each received audio signal;
   decoding said set of audio signals; and
   combining said set of audio signals to generate said combined audio signal to be transmitted to said at least one of said plurality of participants.

2. A method as claimed in claim 1 wherein the audio activity information associated with each data packet comprises a plurality of bits.

3. A method as claimed in claim 1 wherein said selecting the set of audio signals comprises selecting a predetermined number of said received audio signals having a highest measure of audio activity.

4. A method as claimed in claim 3 further comprising adjusting the predetermined number based on a number of the plurality of participants in the communication event.

5. A method as claimed in claim 1 wherein the audio signals are received by a host device.

6. A method as claimed in claim 3 wherein the adjusting further comprises adjusting the predetermined number based on a resource usage of a host device that receives the audio signals.

7. A method as claimed claim 1 wherein the selecting the set of audio signals comprises selecting audio signals having a measure of audio activity above a predetermined threshold.

8. A method as claimed in claim 1 wherein the measure of audio activity is based on energy in the signal.

9. A host device configured to transmit a combined audio signal to at least one of a plurality of participants in a communication event, the host device comprising:
 a receiver configured to receive an audio signal from each of said plurality of participants together with audio activity information associated with each of said received audio signals, each of said received audio signals comprising one or more data packets, and said audio activity information associated with each of said one or more data packets;
 a buffer configured to temporarily store each of said received audio signals comprising the one or more data packets together with said audio activity information;
 a comparator configured to compare a measure of audio activity for each received audio signal to a measure of audio activity within an active audio range based on the audio activity information stored in the buffer and associated with each received signal, and to select a set of audio signals from said received audio signals based on the measure of audio activity for each received audio signal, the measure of audio activity based on a signal-plus-noise to noise ratio of the audio signal;
 a decoder configured to decode said set of audio signals; and
 a combiner configured to combine said set of audio signals to generate said combined audio signal to be transmitted to said at least one of said plurality of participants.

10. The host device as claimed in claim 9 wherein the comparator is further configured to select a predetermined number of audio signals having a highest measure of audio activity.

11. The host device as claimed in claim 9 wherein the comparator is configured to select audio signals having a measure of audio activity above a predetermined threshold.

12. The host device as claimed in claim 9 wherein the comparator is configured to compare the measure of audio activity for each received audio signal based on the audio activity information stored in the buffer.

13. The host device as claimed in claim 9 wherein the host device resides in one of said plurality of participants to which the combined audio signal is to be transmitted.

14. The host device as claimed in claim 9 wherein the host device is a server.

15. A participant device configured to participate in a communication event with a plurality of other participant devices, said participant device comprising:
 an audio signal receiver configured to receive an audio signal from a user of said participant device, the audio signal comprising one or more data packets;
 an audio activity information determiner configured to determine a measure of audio activity in the received audio signal and to generate audio activity information associated with the one or more data packets, the measure of audio activity based on a signal-plus-noise to noise ratio of the audio signal and enabling audio signals comprising audio activity to be compared; and
 a transmitter configured to transmit the audio signal and the associated audio activity information to a host device effective to cause the host device to transmit the audio signal to said plurality of other participant devices based on the audio activity information associated with the audio signal.

16. A communication system comprising a host device and a plurality of participant devices participant in a communication event, wherein each of said participant devices comprises:
 an audio signal receiver configured to receive an audio signal from a user of said participant device, the received audio signal comprising one or more data packets;
 an audio activity information determiner configured to determine a measure of audio activity in the received audio signal and to generate audio activity information associated with the one or more data packets, the measure of audio activity based on a signal-plus-noise to noise ratio of the audio signal and enabling audio signals comprising audio activity to be compared; and
 a transmitter arranged to transmit the audio signal and the audio activity information to the host device effective to cause the host device to:
  receive the audio signal transmitted from each of said plurality of participants together with said audio activity information associated with each of said received audio signals;
  temporarily store each of said received audio signals comprising the one or more data packets together with said audio activity information;
  compare the measure of audio activity for each received audio signal based on the audio activity information associated with each received audio signal, and to select a set of audio signals from said received audio signals based on the analysed measure of audio activity for each signal;
  decode said set of audio signals; and
  combine said set of audio signals to generate said combined audio signal to be transmitted to said at least one of said plurality of participants.

17. A computer program product for transmitting a combined audio signal to at least one of a plurality of participants in a communication event, the computer program product being stored on a computer-readable medium, the computer-readable medium not comprising a signal, and the computer-readable medium comprising program code which when executed by a computer implement a method comprising:
 receiving an audio signal from each of said plurality of participants together with audio activity information associated with each of said received audio signals, each of said received audio signals comprising one or more data packets, and said audio activity information associated with each of said one or more data packets;
 temporarily storing, in a data storage, each of said received audio signals comprising the one or more data packets together with said audio activity information;
 analyzing a measure of audio activity for each received audio signal based on the audio activity information stored in the data storage and associated with each received audio signal, the measure of audio activity based on a signal-plus-noise to noise ratio of each received audio signal and enabling audio signals comprising audio activity to be compared;

selecting a set of audio signals from said received audio signals based on the analyzed measure of audio activity for each received audio signal;

decoding said set of audio signals; and combining said set of audio signals to generate said combined audio signal to be transmitted to said at least one of said plurality of participants.

* * * * *

UNITED STATES PATENT AND TRADEMARK OFFICE
CERTIFICATE OF CORRECTION

| | | |
|---|---|---|
| PATENT NO. | : 8,358,600 B2 | Page 1 of 1 |
| APPLICATION NO. | : 12/004494 | |
| DATED | : January 22, 2013 | |
| INVENTOR(S) | : Bevin et al. | |

It is certified that error appears in the above-identified patent and that said Letters Patent is hereby corrected as shown below:

In the Specification

In Column 5, Line 21, delete "determined" and insert -- determine --, therefor.

In Column 7, Line 47, after "into" delete "to".

Signed and Sealed this
Twenty-fourth Day of February, 2015

Michelle K. Lee
*Deputy Director of the United States Patent and Trademark Office*